United States Patent [19]
Lee et al.

[11] Patent Number: 6,022,643
[45] Date of Patent: Feb. 8, 2000

[54] BORON COMPOUNDS AS ANION BINDING AGENTS FOR NONAQUEOUS BATTERY ELECTROLYTES

[75] Inventors: Hung Sui Lee, East Setauket; Xia-Oing Yang, Port Jefferson Station; James McBreen, Bellport; Caili Xiang, Upton, all of N.Y.

[73] Assignee: Brookhaven Science Associates, Upton, N.Y.

[21] Appl. No.: 08/986,846

[22] Filed: Dec. 8, 1997

[51] Int. Cl.[7] ................................................ H01M 6/14
[52] U.S. Cl. .................... 429/324; 429/303; 429/306; 429/307; 558/293; 558/294
[58] Field of Search .................. 429/303, 306, 429/307, 324, 326; 558/293, 294

[56] References Cited

U.S. PATENT DOCUMENTS

| | | | |
|---|---|---|---|
| 2,951,871 | 9/1960 | Schroeder | 558/293 |
| 4,201,839 | 5/1980 | Johnson et al. | 429/194 |
| 4,522,901 | 6/1985 | Shacklette | 429/194 |
| 4,752,544 | 6/1988 | Gregory | 429/188 |
| 4,833,048 | 5/1989 | Dejonghe et al. | 429/104 |
| 5,278,000 | 1/1994 | Huang et al. | 429/91 |
| 5,416,177 | 5/1995 | Siedle et al. | |
| 5,468,902 | 11/1995 | Castellanos et al. | |
| 5,514,728 | 5/1996 | Lamanna et al. | |
| 5,645,960 | 7/1997 | Scrosati et al. | 429/219 |
| 5,665,492 | 9/1997 | Sotomura | 429/213 |
| 5,849,432 | 12/1998 | Angell et al. | 429/190 |

OTHER PUBLICATIONS

Salomon, *J. Solution Chem.*, 19, 1225 (1990), Month Unkown.
Morita, et al., *J. Electrochem. Soc.*, 134, 2107 (1987), Sep.
Schmidtchen, et al., *Chemical Reviews*, 97, 1609 (1997), Month Unkown.
Lonergan, et al., *J. Am. Chem. Soc.*, 117, 2344 (1995), Month Unkown.
Lee, et al., *J. Electrochem. Soc.*, 143, 3825 (1996), Dec.
Yang, et al., *Phys. Rev.* B40, 7948 (1989), Oct.
Yang, et al., *J. Chem. Phys.* 101 (4), 7416 (1994), Aug.

*Primary Examiner*—Maria Nuzzolillo
*Assistant Examiner*—Jennifer O'Malley
*Attorney, Agent, or Firm*—Margaret C. Bogosian

[57] ABSTRACT

Novel fluorinated boron-based compounds which act as anion receptors in non-aqueous battery electrolytes are provided. When added to non-aqueous battery electrolytes, the fluorinated boron-based compounds of the invention enhance ionic conductivity and cation transference number of non-aqueous electrolytes. The fluorinated boron-based anion receptors include borane and borate compounds bearing different fluorinated alkyl and aryl groups.

30 Claims, 3 Drawing Sheets

(1) $(CH_3O)_3B$    (2) $(CF_3CH_2O)_3B$    (3) $(C_3F_7CH_2O)_3B$ (4) $[(CF_3)_2CHO]_3B$ (5) $[(CF_3)_2C(C_6H_5)O]_3B$ (6) $[(CF_3)_3CO]_3B$ (7) $(C_6H_5O)_3B$ (8) $(FC_6H_4O)_3B$ (9) $(F_2C_6H_3O)_3B$

(10) $(F_4C_6HO)_3B$

(11) $(C_6F_5O)_3B$

(12) $(CF_3C_6H_4O)_3B$

(13) $((CF_3)_2C_6H_3O)_3B$

(14) $(C_6F_5)_3B$ (1) $(CH_3O)_3B$    (2) $(CF_3CH_2O)_3B$    (3) $(C_3F_7CH_2O)_3B$ (4) $[(CF_3)_2CHO]_3B$    (5) $[(CF_3)_2C(C_6H_5)O]_3B$    (6) $[(CF_3)_3CO]_3B$ (7) $(C_6H_5O)_3B$    (8) $(FC_6H_4O)_3B$    (9) $(F_2C_6H_3O)_3B$

(10) $(F_4C_6HO)_3B$    (11) $(C_6F_5O)_3B$    (12) $(CF_3C_6H_4O)_3B$

(13) $((CF_3)_2C_6H_3O)_3B$    (14) $(C_6F_5)_3B$

BORON COMPOUNDS AS ANION BINDING AGENTS FOR NONAQUEOUS BATTERY ELECTROLYTES

This invention was made with Government support under Contract No. DE-AC02-76CH00016, between the U.S. Department of Energy and Associated Universities, Inc. The Government has certain rights in the invention.

BACKGROUND OF THE INVENTION

This invention relates to the design, synthesis and application of novel fluorinated boron based compounds which act as anion receptors in non-aqueous battery electrolytes. As a result, the anion receptors of the present invention can be used as additives to enhance the ionic conductivity and cation transference number of non-aqueous electrolytes. More specifically, the family of anion receptors of the present invention includes borane and borate compounds bearing different fluorinated alkyl and aryl groups.

In the past, research has been conducted on the reduction of ion pairing in non-aqueous electrolytes. The design and synthesis of receptor molecules for the selective complexation of ions has been an active area of research in the last two decades. With respect to lithium batteries, ion pairing accounts for the low lithium transference in non-aqueous electrolytes. To decrease ion pairing, researchers have used either solvents of high dielectric constant or added a neutral ligand to coordinate either the cation or the anion. Coordination with either the cation or anion was expected to increase the cation-anion distance of closest approach and thus decrease ion pair formation. For cation coordination in liquid non-aqueous electrolytes, Salomon [1] has reported the use of crown ether 18-crown-6, Matsuda, et al. [2], the use of 12-crown-4, and Schriever, et al. [3], have used cryptands to decrease ion pair formation in polymer electrolytes.

More recently, research has focused on providing neutral compounds to complex anions. These compounds were summarized in a review article written by F. P. Schmidtchen and M. Berger [4]. However, because anion complexation occurs through hydrogen bonding, these neutral compounds cannot be used in lithium batteries. Lee, et al. have utilized aza-ether based compounds as anion receptor molecules. Electron withdrawing groups were used to substitute amine hydrogen atoms in linear aza-ethers, multi-branched aza-ethers, and cyclic aza-crown ethers [5].

Anion coordination is much more important than cation coordination in lithium battery electrolytes because it offers the ability of increasing both conductivity and lithium transference number. Accordingly, there is still a need in the art of lithium batteries for electrolyte additives which can complex anions, yet are stable in lithium batteries. There is also a need in the art of lithium batteries to enhance the conductivity of inexpensive and environmentally friendly inorganic salts such as LiF, LiCl, LiBr and LiI. In addition, there is a need to increase the transference number of the $Li^+$ ion. In many non-aqueous electrolytes, in particular polymer electrolytes, the transference number of the $Li^+$ ion is low. This introduces additional polarization losses in batteries and reduces the utilization of the cathode material.

It is therefore, an object of the present invention to provide a new family of compounds which enhances the conductivity of lithium battery electrolytes by complexing with the anion moiety of the salt, and also increases the transference number of the $Li^+$ ion in electrolytes.

Another object of the present invention is to increase the conductivity of cost effective electrolyte salts such as LiF, LiCl, LiBr and LiI.

Another object of the present invention is to provide improved electrochemical cells by use of electrolyte additives.

SUMMARY OF THE INVENTION

The present invention, which addresses the needs of the prior art, provides novel fluorinated boron-based compounds which act as anion receptors in non-aqueous battery electrolytes. When added to non-aqueous electrolytes, the receptors of the present invention complex the anion moiety of the electrolyte salt, thereby increasing the conductivity of the electrolytes and the transference number of $Li^+$ ion in electrolytes. The present invention also relates to the use of fluorinated boron-based anion receptors as electrolyte additives for both primary and secondary lithium batteries. Electrolytes used for the electrochemical cells of the present invention include liquid electrolytes using organic solvents, polymer electrolytes, and gel electrolytes.

As a result of the present invention, stable anion receptor compounds are provided which increase dramatically the conductivity of electrolytes for lithium batteries. The electrolyte conductivity is increased because the fluorinated boron-based compounds of the present invention complex anion moieties in non-aqueous electrolytes thereby increasing the concentration of lithium cations available for transport. As a result of using the anion receptors of the present invention, lithium batteries are provided which have significantly increased rate capability or discharge current density. The enhanced batteries of the present invention also have increased cathode utilization because of the increased $Li^+$ ion transference number.

Moreover, when added to liquid, non-aqueous electrolytes containing salts such as LiF, LiCl, LiBr or LiI, $CF_3COOLi$, and $C_2F_5COOLi$, the fluorinated boron-based compounds of the present invention provide a salting-in effect which results in increased solubility and electrolyte conductivity. Thus, another important advantage of using the boron-based compounds of the present invention is the significant cost savings resulting from using low cost electrolyte salts such as LiF, LiCl, LiBr and LiI.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

DETAILED DESCRIPTION OF THE INVENTION

The present invention provides novel anion receptors and methods for their preparation. As used in the present invention, anion receptor means a compound which binds anions thereby moving the ionization equilibrium point of electrolyte salts towards increasing the availability of cation moieties.

Figure 1:
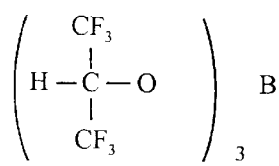
FIG. 1 illustrates the chemical structure of boron based anion receptors and related reference compounds. The numbers next to each formula correspond to the compound number used in the detailed description and examples herein.
Figure 1:
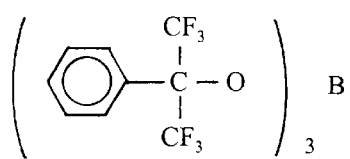
Figure 1:
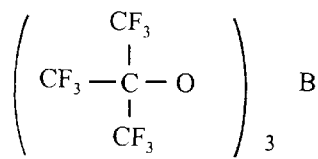
Figure 1:
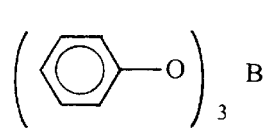
Figure 1:
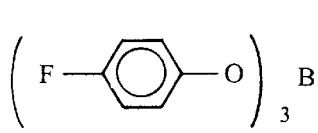
Figure 1:
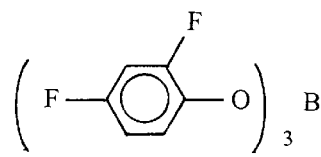
Figure 1:
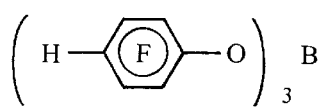
Figure 1:
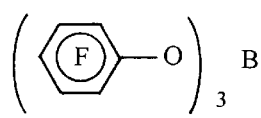
Figure 1:
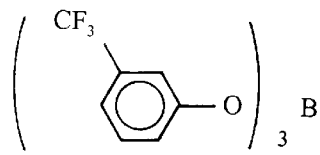
Figure 1:
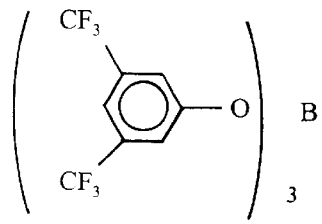
Figure 1:
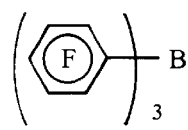

The present invention also provides methods of use for the novel anion receptors as additives to enhance the conductivity of electrolyte in electrochemical cells. More specifically, the present invention provides a family of anion receptors which include boron-based compounds of the formula $Q_3B$. Q is a fluorine bearing moiety selected from the group consisting of $CF_3CH_2O$, $C_3F_7CH_2O$, $(CF_3)_2CHO$, $(CF_3)_2C(C_6H_5)O$, $(CF_3)_3CO$, $FC_6H_4O$, $F_2C_6H_3O$, $F_4C_6HO$, $C_6F_5O$, $CF_3C_6H_4O$, $(CF_3)_2C_6H_3O$ and $C_6F_5$. FIG. 1 illustrates the structures and nomenclature of the anion receptor compounds of the present invention.

It has been discovered that when the fluorinated alkyl and aryl borate and borane compounds of the present invention are added to electrolytes utilized in either primary or secondary lithium batteries, the ionic conductivity is dramatically increased. Near Edge X-ray Absorption Fine Structure (NEXAFS) spectroscopy studies have shown that anions of lithium salts found in many electrolytes form complexes with boron atoms bearing electron withdrawing groups.

Without being bound by any theory, it is believed that the fluorinated allyl and aryl borates and boranes of the present invention increase electrolyte conductivity because they complex the anion moieties of electrolyte salts. Anion complexation causes an increase in the concentration and transference number of cation moieties thereby increasing the rate capability and cathode utilization of an electrochemical cell. Additionally, when used with lithium fluoride, lithium chloride, lithium bromide or lithium iodide, a salting-in effect takes place which increases the solubility of these salts. "Salting in" refers to the mutual increase in the solubilities of an electrolyte and an organic compound added to the same solvent. As a result of anion complexation properties, the new family of fluorinated boron-based compounds of the present invention can be used as electrolyte additives in both primary and secondary lithium and lithium ion batteries.

In a primary cell of the present invention, other cell components include an anode composed of lithium, lithium alloys, lithium carbon intercalation compounds, lithium graphite intercation compounds, lithium metal oxide intercalation compounds, and mixtures thereof.

A cathode is also a component of the primary cell of the present invention. The cathode is composed of a transition metal oxide, a transition metal chalcogenide, a poly (carbon disulfide) polymer, an organo-disulfide redox polymer, a polyaniline, an organodisulfide/polyaniline composite and an oxychloride. Examples include $SO_2$, CuO, CuS, $Ag_2CrO_4$, $I_2$, $PbI_2$, PbS, $SOCl_2$, $V_2O_5$, $MoO_3$ or $MnO_2$ or poly(carbon monofluoride), $(CF)_n$. Organic solvents, such as acetonitrile and propylene carbonate and inorganic solvents, such as thionyl chloride are typical. A compatible solute such as $CF_3COOLi$, $C_2F_5COOLi$, LiI, LiBr, LiCl or LiF is added to provide the necessary electrolyte conductivity.

The boron-based compounds of the present invention are also effective electrolyte additives for secondary or rechargeable batteries. The secondary electrochemical cell containing the electrolyte additive of the present invention includes a lithium metal anode or an anode containing a material capable of reversibly incorporating a lithium metal, a cathode capable of reversibly incorporating a lithium metal, a lithium metal incorporated in at least one of said anode and cathode and an electrolyte. The electrolyte includes an organic solvent, a lithium salt and an electrolyte additive which is an anion complexing agent and can complex with the anion moiety of the electrolyte salt.

The anode material useful for the rechargeable battery of the present invention includes lithium, lithium alloys, such as Li—Al, Li—Si, Li—Cd, lithium-carbon or lithium-graphite intercalation compounds, lithium metal oxide intercalation compounds such as $Li_xWO_2$ or $LiMoO_2$ or a sulfide such as $LiTiS_2$.

Suitable cathode materials include transition metal oxides, metal halides or chalcogenides which intercalate lithium. Examples of oxides and chalcogenides useful in the present invention include: $Li_{2.5}V_6O_{13}$, $Li_{1.2}V_2O_5$, $LiCoO_2$, $LiNiO_2$, $LiMn_2O_4$, $LiMnO_2$, $Li_3NbSe_3$, $LiTiS_2$, $LiMoS_2$. Organo disulfide redox polymers are based on the reversible electrochemical dimerization/scission or polymerization/depolymerization of organo disulfide polymers by the reaction:

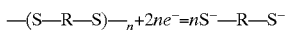

where R is an aliphatic or aromatic moiety and n>50. An example is 2,5 dimercapto-1,3,4-thiadiazole.

In assembling the cells of the present invention, the cathode is typically fabricated by depositing a slurry of the cathode material, the electrically conductive inert material, the binder and a fugitive liquid carrier such as cyclohexane, on the cathode current collector, and then evaporating the carrier to leave a coherent mass in electrical contact with the current collector.

In assembling the cell of the present invention, the anode can similarly be fabricated by depositing a slurry of the highly graphitic carbonaceous anode material, the electrically-conductive inert material, the binder and a fugitive liquid carrier such as hexane on the electrically-conductive anode support and then evaporating the carrier to leave a coherent mass in electrical contact with the support.

The cathode assembly is then combined with the anode assembly with the porous polymeric electrode separator sandwiched therebetween. The preferred way of constructing high voltage rechargeable cells is to make them by using the cathode material in the discharged state which cathode material is lithiated metal oxides, materials stable in air. The layered assembly is then wound around the metallic center post to form a spiral assembly which is then placed into the cell container to which is added the electrolyte solution into which the additive of the present invention has been dissolved. The cell container is then covered with a cell cap.

The electrolyte solution includes a lithium salt dissolved in the electrolyte solvent. The electrolyte salt should be compatible with both the cathode-active material, the anode material and the fluorinated alkyl and aryl boron-based additives of the present invention. Suitable lithium electrolyte salts include $CF_3COOLi$, $C_2F_5COOLi$, LiBr, LiCl, LiI, LiF and mixtures thereof.

Suitable electrolyte solvents include non-aqueous, liquid polar solvents such as ethylene carbonate, dimethyl carbonate and mixtures thereof. Other useful solvents are cyclic and acyclic ethers, organic carbonates, lactones, formates, esters, sulfones, nitrites and oxazolidinones. Useful electrolyte solvents include tetrahydrofuran; 2-methyl tetrahydrofuran; 4-methyl-1,3-dioxolane; 1,3-dioxolane; 1,2-dimethoxytethane ("DME"); dimethoxymethane; ethylene carbonate; propylene carbonate; γ-butyrolactone; methyl formate; sulfolane; acetonitrile; 3-methyl-2-oxazolidinone, N-methyl-2-pyrrolidinone and mixtures thereof.

Polymer electrolytes of several types are also useful for electrochemical cells of the present invention. One type consists of lithium salts dissolved in linear polyethers such as poly(ethylene oxide). Because it is important that the polymer be amorphous and have a low glass transition temperature, the polymer electrolytes may be designed as polymer networks, branched or comb shaped polymers which have flexible inorganic backbones such as $(-P=N-)_n$ or $(-SiO-)_n$. A polymer electrolyte may be further modified by addition of plasticizers such as organic carbonates.

Gelled electrolytes are another type of electrolytes that are useful for the electrochemical cells of the present invention. Gelled electrolytes include a solution of lithium salt in a liquid organic solvent and a supporting matrix of a polymer such as poly(acrylo nitrile) (PAN) or poly(vinylidene fluoride-hexafluoro-propylene (P(VDF-HFP)) copolymer. Examples of lithium salts which can be used in gelled electrolytes are LiF, LiCl, LiBr, LiI, $CF_3COOLi$ and $C_2F_5COOLi$. Binary solvents such as mixture of ethylene carbonate and propylene carbonate can also be used as liquid solvents in gelled electrolytes.

In a secondary electrochemical cell, the fluorinated boron-based compounds of the present invention complex the anion moieties found in the electrolyte thereby increasing the availability of the free cations. For exanple, in a lithium or lithium ion battery, upon leaving the anode, the lithium cation is shuttled across the electrolyte for incorporation into the host lattice of the cathode. Thus, by complexing the anion moiety, more positively charged lithium ions become available for transfer thereby increasing dramatically the ionic conductivity of the battery cell.

For example, LiF is almost insoluble in 1,2-dimethoxyethane; however, after adding a molar equivalent of one of the fluorinated boron compounds of the present invention $(C_6F_5O)_3B$, 1M of LiF solution in DME was obtained and a conductivity as high as $6.8 \times 10^{-3} Scm^{-1}$ was achieved.

The focus of the examples set forth below has been to provide novel syntheses for the fluorinated boron-based compounds of the present invention. Ionic conductivity and NEXAFS studies have been conducted showing that a family of newly developed fluorinated alkyl and aryl borate and borane compounds formed complexes with $Cl^-$ anions, and increased the ionic conductivity by increasing the concentration of free $Li^+$ cations, when used as additives in lithium salts/DME electrolytes. The degree of complexation and conductivity also depended on the structure of the boron compounds.

EXAMPLES

The examples set forth below also serve to provide further appreciation of the invention but are not meant in any way to restrict the scope of the invention. In FIG. 1, methyl borate, compound (1), and phenyl borate, compound (7) were used as reference compounds which are commercially available from Aldrich Chemical Co. All starting materials used in the examples below are commercially available and can be obtained from Aldrich Chemical Co. Further, many of the processes useful in synthesizing the compounds of the present invention were performed under argon atmosphere or under vacuum. NMR spectra were recorded on an Hitachi R-1200 (60 MHZ) NMR spectrometer. FTIR spectra were recorded on a Mattson Cygnes 100 spectrometer.

Example 1

Preparation of Fluorinated Alkyl Borate Compounds (2). (3) and (4)

This example provides a general procedure for the preparation of tris-(2,2,2-trifluoroethyl) borate (2), tris-(1H, 1H-heptafluorobutyl) borate (3) and tris-(2H-hexafluoroisopropyl) borate (4).

0.12 molar of fluorinated alkyl alcohol was slowly added, over a period of 15 minutes to a 4 ml of 10M borane-methyl sulfide (total 0.04 molar) under argon at $-20°$ C. The mixture was then stirred at room temperature for 24 hours. In order to remove the methyl sulfide, 100 ml of pentane was added to the mixture. The mixture was then distilled with a column at atmosphere. After removal of all low boiling point material (methyl sulfide and pentane), the final products were further purified through sublimation or distillation.

The boiling temperatures and NMR data were respectively as follows:

Compound (2), Tris-(2,2,2-trifluoroethyl) borate, boiling point: 78–80° C./100τ NMR(in $CDCl_3$): 4.2(q). (unit: ppm).

Compound (3), Tris-(1H, 1H-heptafluorobutyl) borate, boiling point: 95–96° C./16τ NMR(in $CDCl_3$): 4.35(t). (unit: ppm).

Compound (4), Tris-(2H-hexafluoroisoprepyl) borate, boiling point: 78–80° C./100τ NMR(in $CDCl_3$): 5.8(q). (unit: ppm).

Example 2

Preparation of Fluorinated Triaryl Borate Compounds Compounds (8), (9), (10), (11), (12) and (13)

This example provides a general procedure for the preparation of tris-(2,4-difluorethyl) borate (9), tris-(2,3,5,6-tetrafluorobutyl) borate (10), tris-(pentafluorophenyl) borate (11), tris-(3-trifluoromethyl-phenyl) borate (12), and tris-(3, 5-bis(trifluormethyl)phenyl) borate (13).

An equivalent amount of 1M boron trichloride solution in hexane (70 ml) was added to a solution of 0.21 molar of fluorinated phenol compound in 250 ml of anhydrous methylene chloride at $-78°$ C. over a period of 20 minutes. The reaction mixture was warmed to room temperature and stirred for 12 hours. After removal of the solvent, the crude product was sublimated or distilled under vacuum. The boiling temperatures and NMR data were respectively as follows:

Compound (9), Tris-(2,4-difluoroethyl) borate, boiling point: 95–100° C./0.06τ NMR(in $CDCl_3$): 6.6–7.2(m). (unit: ppm).

Compound (10), Tris-(2, 3, 5, 6-tetrafluorobutyl) borate, boiling point: 120–125° C./0.05τ NMR(in $CDCl_3$): 6.5–7.2(m). (unit: ppm).

Compound (11), Tris-(pentafluorophenyl) borate, boiling point: 115° C./0.15τ NMR(in $CDCl_3$): 6.5–7.2(m). (unit: ppm).

Compound (12), Tris-(3-trifluoromethylphenyl) borate, boiling point: 128–130° C./0.1τ NMR(in $CDCl_3$): 7.4(s). (unit: ppm).

Compound (13), Tris-(3, 5-bis(trifluoromethyl)phenyl) borate, boiling point: 120° C./0.09τ NMR(in $CDCl_3$): 7.6(s, 2H), 7.7(s, 1H). (unit: ppm).

Example 3

Preparation of Tris(pentafluorophenyl) Borane Compound (14)

7.2 g of magnesium turnings was suspended in 300 ml anhydrous ether. 74.2 g of bromopentafluorobenzene was dropped into the suspension to keep the ether refluxing gently. After the addition was completed, the reaction mixture was refluxed for another 1.5 hour. Subsequently, 14.2 g (12.7 ml) of borontrifluoride diethyl etherate was dropped into the black solution at room temperature. Then 350 ml of toluene was added in the mixture. The mixture was refluxed for one hour. After the ether was distilled off, the remaining toluene solution was heated to 100° C. and kept at 100° C. for 18 hours. The unwanted inorganic salt was filtered off from the mixture. The straw colored solid crude product was obtained after removing the toluene solvent by evaporation. The crude product was purified by sublimation at 100–110° C./0.05τ. The pure product, a colorless crystal was obtained through recrystallizing from hexane. The yield was 50%. The melting temperature is 125–127° C.

Example 4

Conductivity Studies

In this example, the ionic conductivity of electrolyte solutions containing various boron based compounds of the present invention was measured and compared with the conductivity of electrolyte solutions without additives.

Conductivity measurements were made at 25° C. using a Hewlett-Packard 4129A Impedance Analyzer in the frequency range from 5 Hz to 10 MHZ. Cells with platinum electrodes were used for the measurements. The cell constants were calibrated by measuring a 0.05N KCl standard aqueous solution. The ionic conductivity of solutions formed by adding various boron based compounds to the 0.2M of lithium salts in DME solution was compared with the conductivity of a 0.2M lithium salt solutions without additives. Table I, below, lists the ionic conductivity data of 0.2M lithium salts only in DME solutions as well as data for the same solutions containing additives of boron based compounds.

From Table I, it is apparent that the DME solutions with lithium salt only have very low ionic conductivity, in the range of $5\times10^{-6}$ S/cm to $3\times10^{-5}$ S/cm at room temperature except the LiI solution, which reached $7.3\times10^{-4}$. LiF salt is not soluble in DME. When the reference compound (1) was added to the solutions, the solubility of the salts and conductivity of the solutions did not change at all. When fluorinated alkyl borates represented by compounds (2) and (3) were added to the solutions, the solubility of the salts and the conductivity of the solutions were both increased.

The most significant increase of conductivity of the lithium salt solutions was obtained when compound (4), the branched tris-(2H-hexafluoroisopropyl) borate was added. The ionic conductivity reached to middle of $10^{-3}$ for LiCl, LiI, $CF_3$ COOLi and $C_2F_5$COOLi. However for LiF, the ionic conductivity was in the low $10^{-5}$ range. Thus, compound (4) did not increase the solubility of LiF in DME.

The effects of fluoridation of these compounds on ionic conductivity of the lithium salt solutions were demonstrated more clearly through measuring the conductivity of solutions containing compound (7), (8), (9), (10), and (11). For solutions containing compound (7) (unfluorinated triaryl borate), the conductivity of each solution was increased only a little comparing to the corresponding solution without additive. When compounds (8), (9), (10), and (11) in which 1, 2, 4, and 5 H were replaced by F, were added to lithium salt solutions, the ionic conductivity of the solutions increased accordingly. For example, when the additive for LiF/DME solution was changed from compound (8) to compound (9), (10) and (11), the conductivity was increased from $1.7\times10^{-5}$ to $1.7\times10^{-4}$ to $8.8\times10^{-4}$ to $2.9\times10^{-3}$ S/cm, respectively.

Compounds (12) and (13) were synthesized and studied to find the effects of different electron withdrawing groups on the borate compounds. When $CF_3$ was used in place of F to substitute the H atoms, the enhancement to conductivity was slightly larger. The fully fluorinated triaryl borane exemplified by compound (14) also produced a significant enhancement to the conductivity of the lithium salt solutions when used as an additive.

The effects of concentration of additives and salts on conductivity were also studied. The results are listed in Table II below.

TABLE I

Ionic Conductivity of 0.2M Boron Compound + 0.2M Lithium Salt in DME Lithium Salts

| Boron Compounds | $CF_3$COOLi | $C_2F_5$COOLi | LiF | LiCl | LiI |
| --- | --- | --- | --- | --- | --- |
| | | | Conductivity (S/cm) | | |
| Salt only | $3.3 \times 10^{-5}$ | $2.1 \times 10^{-5}$ | | $5.0 \times 10^{-6}$ | $7.3 \times 10^{-4}$ |
| (1) $(CH_3O)_3B$ | $2.3 \times 10^{-5}$ | $1.7 \times 10^{-5}$ | | $5.0 \times 10^{-6}$ | $8.3 \times 10^{-4}$ |
| (2) $(CF_3CH_2O)_3B$ | $1.9 \times 10^{-4}$ | $7.0 \times 10^{-5}$ | $1.6 \times 10^{-5}$ | $5.4 \times 10^{-5}$ | $1.6 \times 10^{-3}$ |
| (3) $(C_3F_7CH_2O)_3B$ | $2.6 \times 10^{-4}$ | $1.1 \times 10^{-4}$ | $1.5 \times 10^{-5}$ | $8.4 \times 10^{-5}$ | $1.8 \times 10^{-3}$ |
| (4) $[(CF_3)_2CHO]_3B$ | $3.9 \times 10^{-3}$ | $4.6 \times 10^{-3}$ | $1.3 \times 10^{-5}$ | $3.8 \times 10^{-3}$ | $4.1 \times 10^{-3}$ |
| (5) $[(CF_3)_2C(C_6H_5)O]_3B$ | $3.8 \times 10^{-5}$ | $2.0 \times 10^{-5}$ | | $4.6 \times 10^{-6}$ | $7.0 \times 10^{-4}$ |
| (6) $[(CF_3)_3CO)]_3B$ | $3.8 \times 10^{-3}$ | | | | |
| (7) $(C_6H_5O)_3B$ | $1.3 \times 10^{-4}$ | $6.3 \times 10^{-5}$ | | $1.2 \times 10^{-5}$ | $1.2 \times 10^{-3}$ |
| (8) $(FC_6H_4O)_3B$ | $6.2 \times 10^{-4}$ | $4.0 \times 10^{-4}$ | $1.7 \times 10^{-5}$ | $6.2 \times 10^{-5}$ | $1.8 \times 10^{-3}$ |
| (9) $(F_2C_6H_3O)_3B$ | $1.5 \times 10^{-3}$ | $1.4 \times 10^{-3}$ | $1.7 \times 10^{-4}$ | $2.7 \times 10^{-4}$ | $2.1 \times 10^{-3}$ |
| (10) $(F_4C_6HO)_3B$ | $2.3 \times 10^{-3}$ | $2.0 \times 10^{-3}$ | $8.8 \times 10^{-4}$ | $1.7 \times 10^{-3}$ | $2.2 \times 10^{-3}$ |
| (11) $(C_6F_5O)_3B$ | $3.3 \times 10^{-3}$ | $3.7 \times 10^{-3}$ | $2.9 \times 10^{-3}$ | $3.0 \times 10^{-3}$ | $3.2 \times 10^{-3}$ |
| (12) $(CF_3C_6H_4O)_3B$ | $2.2 \times 10^{-3}$ | $2.3 \times 10^{-3}$ | | $1.1 \times 10^{-3}$ | $2.6 \times 10^{-3}$ |
| (13) $((CF_3)_2C_6H_3O)_3B$ | $2.8 \times 10^{-3}$ | | | | |
| (14) $(C_6F_5)_3B$ | $3.2 \times 10^{-3}$ | $3.8 \times 10^{-3}$ | $1.7 \times 10^{-3}$ | $2.6 \times 10^{-3}$ | $2.2 \times 10^{-3}$ |

TABLE II

| | CONDUCTIVITY (S/cm) | | |
|---|---|---|---|
| CONCENTRATION | $CF_3COOLi$ | $C_2F_5COOLi$ | LiF |
| (4) $[(CF_3)_2CHO]_3B$ | | | |
| 0.2M | $3.9 \times 10^{-3}$ | $4.6 \times 10^{-3}$ | |
| 0.3M | $5.5 \times 10^{-3}$ | $6.3 \times 10^{-3}$ | |
| 0.4M | $6.6 \times 10^{-3}$ | $7.7 \times 10^{-3}$ | |
| 0.5M | $7.9 \times 10^{-3}$ | $8.5 \times 10^{-3}$ | |
| 0.8M | $8.9 \times 10^{-3}$ | $9.5 \times 10^{-3}$ | |
| 1.0M | $8.9 \times 10^{-3}$ | $9.2 \times 10^{-3}$ | |
| 1.2M | $8.2 \times 10^{-3}$ | $8.6 \times 10^{-3}$ | |
| (11) $(C_6F_5O)_3B$ | | | |
| 0.2M | $3.3 \times 10^{-3}$ | $3.2 \times 10^{-3}$ | $4.1 \times 10^{-3}$ |
| 0.3M | $3.7 \times 10^{-3}$ | $4.4 \times 10^{-3}$ | $4.1 \times 10^{-3}$ |
| 0.4M | $4.5 \times 10^{-3}$ | $5.5 \times 10^{-3}$ | $5.6 \times 10^{-3}$ |
| 0.5M | $5.9 \times 10^{-3}$ | $6.1 \times 10^{-3}$ | $6.0 \times 10^{-3}$ |
| 0.8M | $5.6 \times 10^{-3}$ | $6.4 \times 10^{-3}$ | |
| 1.0M | $5.2 \times 10^{-3}$ | $5.8 \times 10^{-3}$ | $6.8 \times 10^{-3}$ |
| 1.2M | $4.4 \times 10^{-3}$ | $5.4 \times 10^{-3}$ | |
| (14) $(C_6F_5)_3B$ | | | |
| 0.2M | $3.2 \times 10^{-3}$ | $3.0 \times 10^{-3}$ | $1.7 \times 10^{-3}$ |
| 0.3M | $5.1 \times 10^{-3}$ | $4.2 \times 10^{-3}$ | $3.5 \times 10^{-3}$ |
| 0.4M | $6.3 \times 10^{-3}$ | $4.9 \times 10^{-3}$ | $4.7 \times 10^{-3}$ |
| 0.5M | $6.8 \times 10^{-3}$ | $5.4 \times 10^{-3}$ | $6.4 \times 10^{-3}$ |
| 0.8M | $6.7 \times 10^{-3}$ | $5.9 \times 10^{-3}$ | |
| 1.0M | $6.0 \times 10^{-3}$ | $5.4 \times 10^{-3}$ | $6.2 \times 10^{-3}$ |
| 1.2M | $5.4 \times 10^{-3}$ | $4.4 \times 10^{-3}$ | |

Three additives, compounds (4), (11), and (14), which showed the largest conductivity enhancement at 0.2M concentration, were studied further at 0.2M, 0.3M, 0.4M, 0.5M, 0.8M, 1.0M, AND 1.2M concentration. Three lithium salts, $CF_3COOLi$, $C_2F_5COOLi$, and LiF were used in this study. Because the solubility of the salts is more or less related to the concentration of the additives, especially for LiF, the salt concentration of the salt was chosen to be the same as the concentration of the additive in each solution. For all three additives studied, the maximum of conductivity was reached at 0.8M for $CF_3COOLi$ and $C_2F_5COOLi$. The solubility of LiF in DME was too low when compound (4) was used as additive, and thus, the conductivity was not measured for this group. For compounds (11) and (14) in LiF solutions, a conductivity as high as $6 \times 10^{-3}$ was reached for concentrations above 0.5M. For all of the eight groups of salt-additives combinations studied, at least one concentration reached a conductivity at $6 \times 10^{-3}$ level. At this level, the solution is good enough to be used as liquid electrolyte in lithium ion batteries providing other properties such as thermal and electrochemical stability were satisfactory.

Example 5

NEXAFS Studies

Since both anion and cation participate in ionic conduction, conductivity studies alone are insufficient evidence for anion complexation by the boron based compounds of the present invention. In order to confirm anion complex formation and to find out the detailed structure of the formed complexes, NEXAFS measurements were made at the Cl K edge on LICl/DME electrolytes with and without anion complexing agents. The measurements were done at Beam Line X19A of the National Synchrotron Light Source. The data was collected as fluorescence excitation spectra using a large solid angle ionization chamber as the fluorescence detector. After being used in conductivity measurements, the solutions were poured into cells with thin Mylar windows for NEXAFS studies.

In a NEXAFS experiment, as the incident x-ray energy is scanned through the chlorine K-edge, the ejected 1s photoelectrons can undergo bound state transitions to empty 3p states. Coordination symmetry can affect the energy levels of the 3p states and hence the fine structure of the absorption spectrum immediately above the edge.

Figure 2:
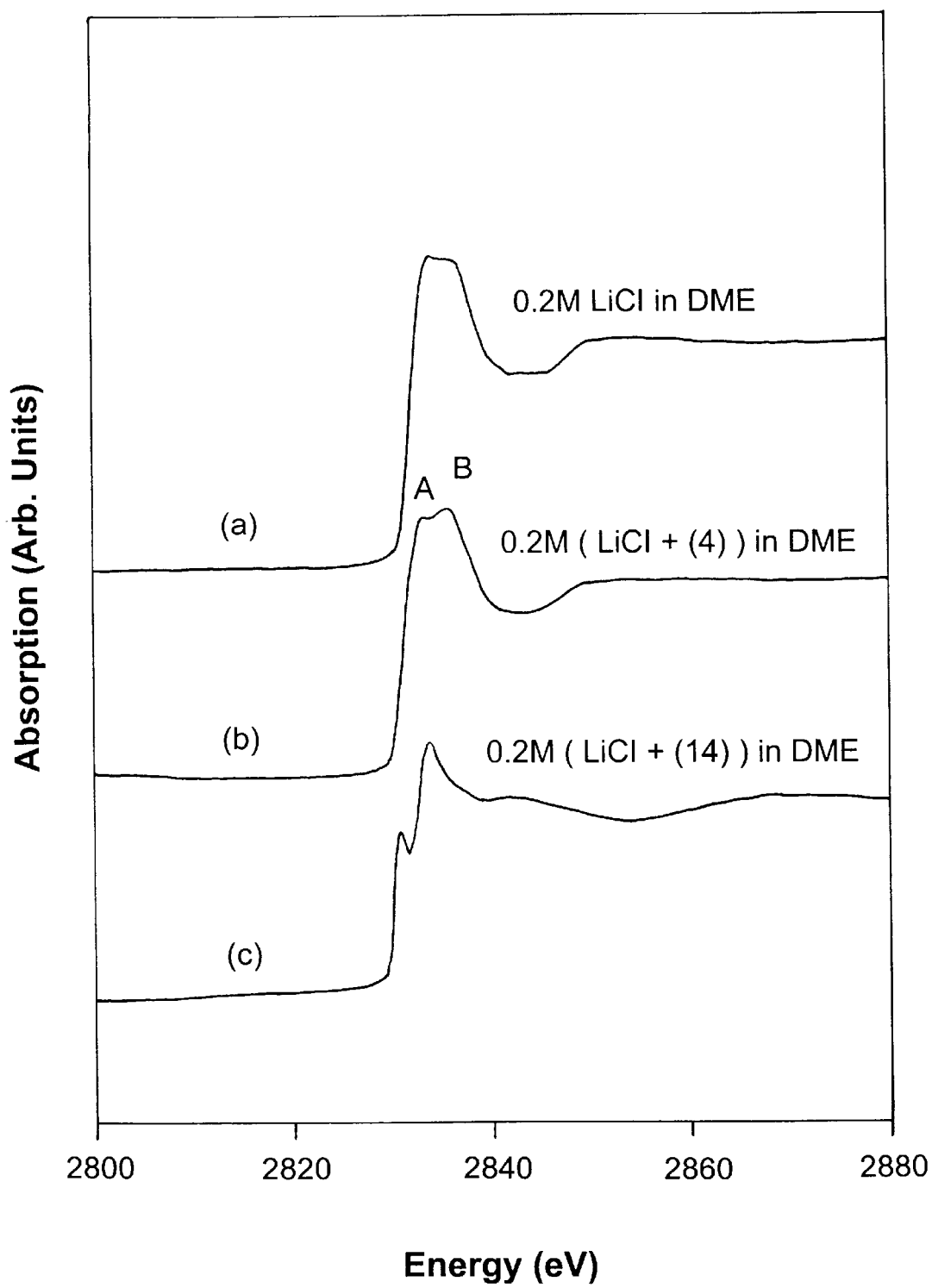
FIG. 2 illustrates near-edge x-ray absorption spectra (NEXAFS) at the K edge of chlorine for: (a) LiCl salt in DME solution, (b) 0.2M (LiCl+compound(4)) in DME, and (c) 0.2M (LiCl+compound (14)) in DME.

FIG. 2 shows the dramatic effect on the fine structure of absorption spectra by boron based electrolyte additives bearing different electron withdrawing groups. Data is given for (a) 0.2M LiCl in DME, (b) 0.2M LiCl+0.2M compound (4) in DME solution, and (c) 0.2M LiCl +0.2M compound (14) in DME solution. The "white line" peak, between 2820 and 2840 eV, above the edge, is due to dipole-allowed transitions to final states of p symmetry. The structure of the "white line" is very sensitive to the coordination of the absorbing atom; it has been used to study the coordination of K in a KI/PEO complex [6] and ion pairing of potassium salts in plasticizers [7]. It was also used to study the complexation between $Cl^-$ and aza based anion receptors [5].

The so called "white line" refers to the strong absorption peak above the edge energy which appeared as a white line in the days when photographic film was used for detection. The white line in curve (a) for LiCl in DME is a broad peak, with a small shoulder on the low energy side. The shoulder is labeled as feature (A) and the main peak as feature (B). Similar structures were found for $Cl^-$ in free ion state, such as LiCl and KCl in dilute aqueous solutions. In such a symmetric environment the 3p final states of the $Cl^-$ are close to being degenerate and the transition feature is a broad peak. White line peak splitting can occur if there is an asymmetric distribution of atoms (or molecules) surrounding the $Cl^-$ with strong bonding. The more asymmetric the distribution is, the stronger the splitting effect will be. The asymmetric local field experienced by each of the degenerate 3p final states of $Cl^-$ is different and the degeneracy is lifted. This results in a splitting of the absorption peak.

When the LiCl salt was dissolved in DME, the white line splitting is almost undetectable, since the distribution of the solvent molecules has spherical symmetry surrounding the $Cl^-$ ions, and the interaction between solvent and $Cl^-$ is weak. These anions were classified as uncomplexed anions. In curve (b), a clear split was observed when compound (4) was added into the electrolyte solution. Feature (A) became a clear peak. This information provided strong evidence that $Cl^-$ is indeed complexed with the boron atom in compound (4). Curve (c) for solution containing LiCl and compound (14) is quite different from curves (a) and (b). The white line was not only split but also changed shape completely.

Figure 3:
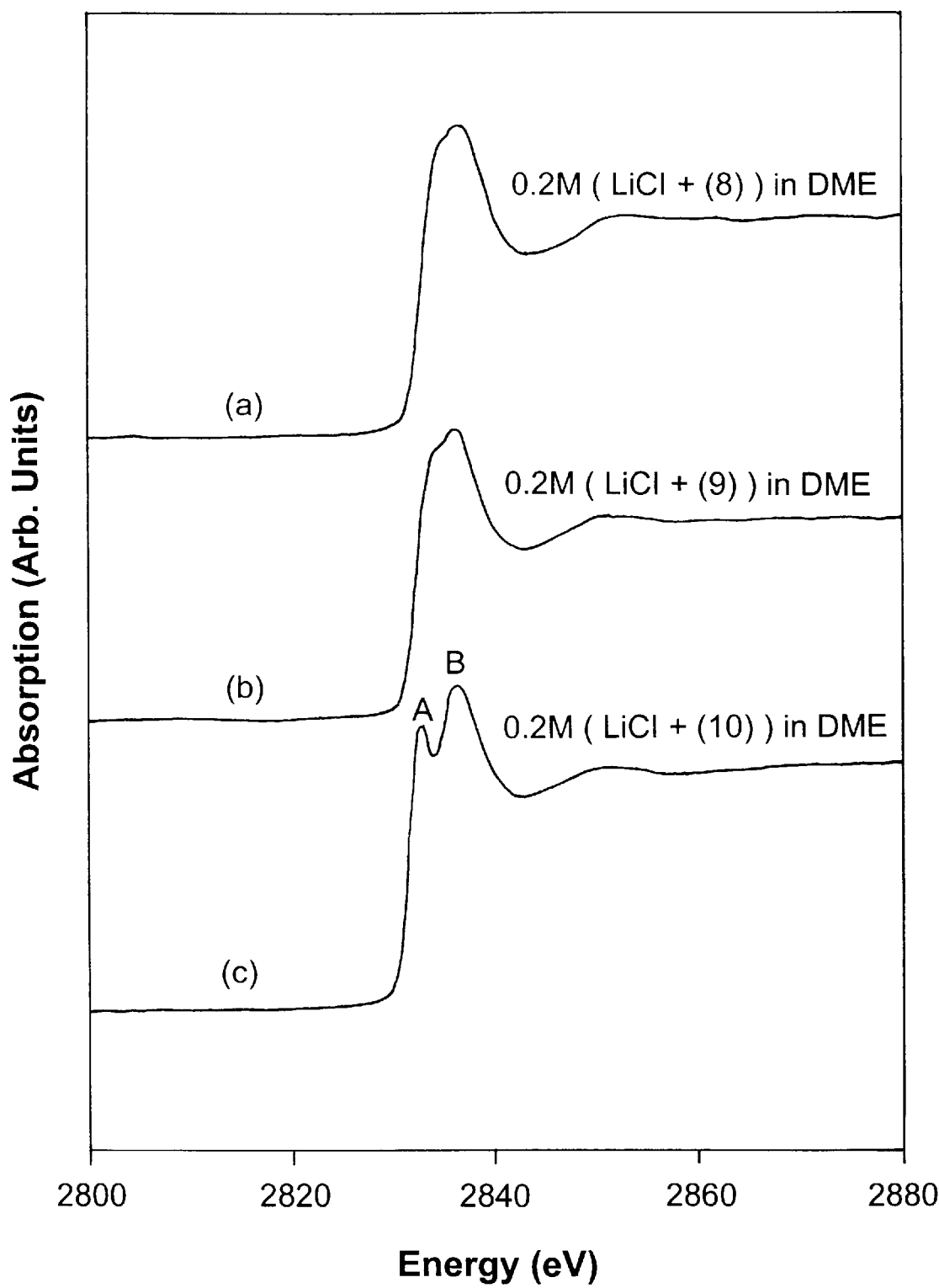
FIG. 3 shows near-edge x-ray absorption spectra at the K edge of chlorine in the following DME solutions: (a) 0.2M (LiCl+compound (8)), (b) 0.2M (LiCl+compound(9)), and (c) 0.2M (LiCl+compound (10)).

The effect of electron withdrawing groups on the white line splitting can also be observed from FIG. 3. In curve (a), compound (8) which had one H substituted by F was used as additive, but there was no white line splitting. In curve (b), compound (9) which had two H atoms substituted by F atoms was used as additive. Curve (b) shows small splitting of the white line. In curve (c), compound (10) which had four H atoms being substituted by F atoms was used as additive. The white line spitting was clearly observed. These results are in good agreement with the conductivity data set forth in Table I.

Ionic conductivity and NEXAFS studies as conducted in Examples 4 and 5 above, show that a family of newly developed fluorinated alkyl and aryl borate and borane compounds form complexes with $Cl^-$ anions, and increase the ionic conductivity by increasing the concentration of free $Li^+$ cations, when used as additives in lithium salts/DME electrolytes. The degree of complexation and conductivity also depends on the structure of the boron compounds.

Bibliography

The following publications mentioned in the foregoing specification are incorporated herein by reference as if set forth in full for all they disclose:

[1] M. Salomon, *J Solution Chem.*, 19, 1225 (1990).
[2] M. Morita, H. Hayashida and Y. Matsuda, *J Electrochem. Soc.*, 134, 2107 (1987).
[3] F. P. Schmidtchen and M. Berger, *Chemical Reviews*, 97, 1609 (1997).
[4] M. C. Lonergan, M. A. Ratner and D. Shriver, *J Am. Chem. Soc.*, 117, 2344 (1995).
[5] H. S. Lee, X. Q. Yang, J. McBreen, L. S. Chio and Y. Okamoto, *J Electrochem. Soc.*, 143, 3825 (1996).
[6] X. Q. Yang, J. M. Chen, T. A. Skotheim, Y. Okamoto, J. Kirkland and M. L. denBoer, *Phys. Rev.* B40, 7948 (1989).
[7] X. Q. Yang, H. S. Lee, J. McBreen, Z. S. Xu, T. A. Skotheim, Y. Okamoto and F. Lu, *J. Chem. Phys.* 101 (4), 7416 (1994).

What is claimed is:

1. An anion receptor which comprises a boron-based compound of the formula $$Q_3B$$

wherein Q is a fluorine bearing moiety selected from the group consisting of $(CF_3)_2CHO$, $(CF_3)_2C(C_6H_5)O$, $(CF_3)_3CO$, $FC_6H_4O$, $F_2C_6H_3O$, $F_4C_6HO$, $C_6F_5O$, $CF_3C_6H_4O$, and $(CF_3)_2C_6H_3O$.

2. An electrochemical cell which comprises a non-aqueous electrolyte solvent and an electrolyte additive including a boron-based anion receptor wherein said boron-based anion receptor contains a fluorine bearing moiety.

3. The electrochemical cell of claim 2, wherein said boron-based anion receptor is a compound having the formula $$Q_3B$$

wherein Q is selected from a group of fluorinated alkyl and aryl groups consisting of $CF_3CH_2O$, $C_3F_7CH_2O$, $(CF_3)_2CHO$, $(CF_3)_2C(C_6H_5)O$, $(CF_3)_3CO$, $FC_6H_4O$, $F_2C_6H_3O$, $F_4C_6HO$, $C_6F_5O$, $CF_3C_6H_4O$, $(CF_3)_2C_6H_3O$ and $C_6F_5$.

4. The electrochemical cell of claim 2, wherein said non-aqueous electrolyte solvent is selected from the group consisting of tetrahydrofuran, 2-methyl furan, 4-methyldioxolane, 1,3-dioxolane, 1,2-dimethoxyethane, dimethoxymethane, ethylene carbonate, propylene carbonate, γ-butyrolactone, methyl formate, sulfolane, acetonitrile and 3-methyl-2-oxazolidinone, dimethyl carbonate, dimethyl ether and 1-methyl-2-pyrrolidinone.

5. The electrochemical cell of claim 2, wherein said electrolyte solvent is poly(ethylene oxide).

6. The electrochemical cell of claim 2, wherein said electrolyte solvent is a gel electrolyte selected from the group consisting of poly(acrylo nitrile) and poly(vinylidene flouride-hexafluoro propylene).

7. The electrochemical cell of claim 6, further comprising a lithium salt in a liquid organic solvent wherein said lithium salt is selected from the group consisting of LiF, LiCl, LiBr, LiI, $CF_3COOLi$, $C_2F_5COOLi$, $C_6F_5COOLi$ and mixtures thereof.

8. The electrochemical cell of claim 6, wherein said liquid organic solvent is a compound selected from the group consisting of ethylene carbonate, propylene carbonate, dim-ethyl carbonate, dimethyl ether, γ-butyrolactone, 3-methyl-2-oxazolidinone, 1-methyl-2-pyrrolidinone and a mixture thereof.

9. The electrochemical cell of claim 2, further comprising an electrolyte solute selected from the group consisting of LiF, LiCl, LiBr, LiI, $CF_3COOLi$, $C_2F_5COOLi$, and mixtures thereof.

10. The electrochemical cell of claim 2, further comprising an anode selected from the group consisting of lithium, lithium alloys, lithium carbon intercalation compounds, lithium graphite intercalation compounds, lithium metal oxide intercalation compounds, and mixtures thereof.

11. The electrochemical cell of claim 2, further comprising a cathode selected from the group consisting of a transition metal oxide, a transition metal chalcogenide, a poly(carbon disulfide) polymer, an organo-disulfide redox polymer, a polyaniline, an organo-disulfide/polyaniline composite and an oxychloride.

12. The electrochemical cell of claim 11, wherein said transition metal oxide is selected from the group consisting of $Li_{2.5}V_6O_{13}$, $Li_{1.2}V_2O_5$, $LiCoO_2$, $LiNiO_2$, $LiMn_2O_4$, $LiMnO_2$.

13. The electrochemical cell of claim 4, wherein said transition metal chalcogenide is selected from the group consisting of $Li_3NbSe_3$, $LiTiS_2$ and $LiMoS_2$.

14. The electrochemical cell of claim 11, wherein said organo-disulfide redox polymers are formed by reversible electrochemical dimerization/scission or polymerization/depolymerization of organo disulfide polymers by the reaction:

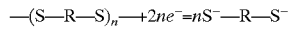

wherein R is an aliphatic or aromatic entity and n>50.

15. The electrochemical cell of claim 11, wherein said organo-disulfide/polyaniline composite is a mixture of polyaniline and 2,5 dimercapto-1,3,4-thiadiazole.

16. A method of enhancing the conductivity of a non-aqueous battery electrolyte which comprises providing a conductivity enhancing amount of fluorinated boron-based anion receptor.

17. The method of claim 16, wherein said anion receptor contains a fluorine bearing moiety selected from the group consisting of $CF_3CH_2O$, $C_3F_7CH_2O$, $(CF_3)_2CHO$, $(CF_3)_2C(C_6H_5)O$, $(CF_3)_3CO$, $FC_6H_4O$, $F_2C_6H_3O$, $F_4C_6HO$, $C_6F_5O$, $CF_3C_6H_4O$, $(CF_3)_2C_6H_3O$ and $C_6F_5$.

18. The method of claim 16, further comprising providing an electrolyte solute selected from the group consisting of $LiClO_4$, $LiAsF_6$, $LiBF_4$, $LiPF_6$ and $LiSbF_6$.

19. The method of claim 16, further comprising providing an electrolyte solute selected from the group consisting of LiF, LiCl, LiBr, LiI, $CF_3COOLi$, $C_2F_5COOLi$, and mixtures thereof.

20. A non-aqueous battery electrolyte comprising:
   a solvent;
   a lithium salt; and
   an additive comprising an anion receptor which includes a boron based compound; wherein said boron-based compound has the formula $Q_3B$ and wherein Q is a fluorine bearing moiety.

21. The non-aqueous battery electrolyte of claim 20, wherein said fluorine bearing moiety is selected from the group consisting of $CF_3CH_2O$, $C_3F_7CH_2O$, $(CF_3)_2CHO$, $(CF_3)_2C(C_6H_5)O$, $(CF_3)_3CO$, $FC_6H_4O$, $F_2C_6H_3O$, $F_4C_6HO$, $C_6F_5O$, $CF_3C_6H_4O$, and $(CF_3)_2C_6H_3O$.

22. The non-aqueous battery electrolyte of claim 20, wherein said solvent is selected from the group consisting of tetrahydrofuran, 2-methyl furan, 4-methyldioxolane, 1,3-dioxolane, 1,2-dimethoxyethane, dimethoxymethane, ethylene carbonate, propylene carbonate, sulfolane, γ-butyrolactone, methyl formate, acetonitrile and 3-methyl-2-oxazolidinone, dimethyl carbonate, dimethyl ether, 1-methyl-2-pyrrolidinone and mixtures thereof and poly (ethylene oxide).

23. The non-aqueous battery electrolyte of claim 21, wherein said solvent is selected from the group consisting of tetrahydrofuran, 2-methyl furan, 4-methyldioxolane, 1,3-dioxolane, 1,2-dimethoxyethane, dimethoxymethane, ethylene carbonate, propylene carbonate, γ-butyrolactone, methyl formate, sulfolane, acetonitrile and 3-methyl-2-oxazolidinone, dimethyl carbonate, dimethyl ether, 1-methyl-2-pyrrolidinone and mixtures thereof and poly (ethylene oxide).

24. The non-aqueous battery electrolyte of claim 20, wherein said solvent is a gel electrolyte selected from the group consisting of poly(acrylo nitrile) and poly(vinylidene flouride-hexafluoro propylene).

25. The non-aqueous battery electrolyte of claim 20, wherein said lithium salt is selected from the group consisting of LiF, LiCl, LiBr, LiI, $CF_3COOLi$, $C_2F_5COOLi$, $C_6F_5COOLi$ and mixtures thereof.

26. The non-aqueous battery electrolyte of claim 23, wherein said lithium salt is selected from the group consisting of LiF, LiCl, LiBr, LiI, $CF_3COOLi$, $C_2F_5COOLi$, $C_6F_5COOLi$ and mixtures thereof.

27. A non-aqueous battery electrolyte additive comprising an anion receptor which includes a boron based compound; wherein said boron-based compound has the formula $Q_3B$; and wherein Q is a fluorine bearing moiety.

28. The non-aqueous battery electrolyte additive of claim 27, wherein said fluorine bearing moiety is selected from the group consisting of $CF_3CH_2O$, $C_3F_7CH_2O$, $(CF_3)_2CHO$, $(CF_3)_2C(C_6H_5)O$, $(CF_3)_3CO$, $FC_6H_4O$, $F_2C_6H_3O$, $F_4C_6HO$, $C_6F_5O$, $CF_3C_6H_4O$, and $(CF_3)_2C_6H_3O$.

29. The non-aqueous battery electrolyte additive of claim 27, further comprising an electrolyte solute selected from the group consisting of $LiClO_4$, $LiAsF_6$, $LiBF_4$, $LiPF_6$ and $LiSbF_6$.

30. The non-aqueous battery electrolyte additive of claim 27, further comprising an electrolyte solute selected from the group consisting of LiF, LiCl, LiBr, LiI, $CF_3COOLi$, $C_2F_5COOLi$, and mixtures thereof.

* * * * *